3,161,604
NOVEL COPPER CONTAINING POLYMERIZATION CATALYSTS
Perry A. Argabright, Piscataway, and Edwin A. Schmall, Roselle Park, N.J., assignors to Esso Research and Engineering Company, a corporation of Delaware
No Drawing. Filed Nov. 6, 1959, Ser. No. 851,245
4 Claims. (Cl. 252—429)

This invention relates to the preparation of novel catalysts for the polymerization of alpha olefins. More particularly, this invention relates to the partial reduction of transition metal compounds with copper metal and to the activation of the resulting cocrystallized compound with organo-metallic compounds and their use as catalysts for the polymerization of alpha olefins.

The low-pressure polymerization and copolymerization of alpha olefins with catalyst systems made up of a partially reduced heavy transition metal halide and a reducing metal-containing compound to high density, often isotactic, high molecular weight, solid, relatively linear products is now well known, see e.g. Belgian Patent 533,362, "Chemical and Engineering News," April 8, 1957, pages 12 through 16, and "Petroleum Refiner," December 1956, pages 191 through 196.

One of the most active catalysts of the above type was found to be crystalline titanium chloride cocrystallized with aluminum chloride. This catalyst has been prepared by a number of methods; see, for example, Serial No. 766,376 filed October 10, 1958, to E. Tornqvist and A. W. Langer, Jr., now Patent 3,032,513.

It has now surprisingly been found that when a transition metal halide such as titanium tetrachloride is partially reduced with finely divided copper metal and activated with an organo-metallic compound a very highly active catalyst is formed for the polymerization and copolymerization of alpha olefins. This catalyst, when used to polymerize propylene for example, gives a higher catalyst activity than any previously reported propylene polymerization catalyst, and additionally produces an excellent grade of high crystallinity polypropylene.

The process for preparing the catalyst of the invention is carried out by forming a slurry of from 1 to 7 moles of a transition metal compound with one mole of finely divided copper metal in an inert diluent and heating the slurry at a temperature in the range of 80° to 200° C., preferably 50 to 150° C. Neither the reduction temperature nor the reaction time is critical. The reaction time is generally in the range of 0.25 to 24 hours, preferably 1 to 6 hours, depending on the temperature of reaction utilized.

The powdered copper metal used in the process is a finely divided copper metal such as electro-plated copper dust. In general, the particle size of the copper metal is in the range of 1–100 microns.

The diluents used for the reduction are straight and branched chain aliphatic hydrocarbons and aromatic hydrocarbons. Examples of the aliphatic hydrocarbons are n-heptane, n-hexane, n-decane, neopentane, isoheptane, etc. The aromatic hydrocarbons are the preferred diluents for use in the reduction reaction and examples of these are benzene, toluene, xylene, mesitylene, pseudocumene, ethylbenzene, cymene, tetralin, decalin, chlorobenzene, o-dichlorobenzene, orthochlorotoluene and the like. Benzene and toluene are particularly preferred since these diluents form only minimal amounts of resins during the reduction reaction. When a temperature above the boiling point of the diluent is chosen for the reduction, pressure is employed to the extent necessary to maintain the diluent in liquid form.

The structure of the product obtained by reducing $TiCl_4$ with copper metal was proven to be predominantly $TiCl_3$ cocrystallized with CuCl. The general class of transition metal compounds utilized for the reduction is such that the product of the reduction will be a partially reduced transition metal compound cocrystallized with the corresponding cuprous compound. For example, when $VBr_4$ is reduced with copper metal, the final product is mainly $VBr_3 \cdot CuBr$. Also, transition metal compounds in a lower oxidation state prepared by the above reduction process are within the scope of the invention. For example, $TiCl_2 \cdot CuCl$ or $TiCl \cdot CuCl$ can be prepared by reducing $TiCl_3$ and $TiCl_2$ respectively with copper powder.

The transition metal compounds useful in the present reduction are the transition metals of Groups IV–A and V–A according to the Periodic Chart of Henry D. Hubbard revised edition 1956; for example, titanium, zirconium, hafnium, vanadium, niobium, and tantalum. The transition metal compounds are halides and oxyhalides such as the chlorides, bromides, iodides, oxychlorides, etc. The ratio of partially reduced metal halide to cuprous halide in the reduction product is predominately unity although this invention is not limited to this ratio. Ratios of titanium halides to cuprous halide can range from about 1 to 3 moles of titanium halide per mole of cuprous halide.

The partially reduced transition metal compound cocrystallized with the corresponding cuprous compound is present in finely divided form in the diluent used in the reduction. The diluent can be separated from the catalyst component for purification purposes by a simple low vacuum filtration. The following alternative procedures can be employed to prepare the complete catalyst therefrom: (1) the reaction mixture can be treated directly with an organo-metallic compound to activate the reduction product; or more preferably, for facile polymerization, (2) the partially reduced transition metal compound cocrystallized with the corresponding cuprous compound can be isolated from the reaction mixture, such as by filtering, preferably at or close to the temperature of the reduction, then pebble-milled or preferably metal ball-milled when dry to produce a highly active catalyst component, and thereafter slurried in a hydrocarbon diluent and treated with an organo-metallic compound.

When the second procedure is used, the hydrocarbon diluent that can be used to slurry the ball-milled catalyst component includes paraffinic hydrocarbons such as propane, isopentane, heptane, decane or other saturated petroleum or synthetic hydrocarbon oils, e.g. white mineral oil, naphthenes such as methyl cyclohexane or decalin, aromatics such as benzene, xylene, and the like. However, aromatic hydrocarbons are usually preferred.

A large number of organo-metallic compounds can be used to activate the cocrystallized partially reduced transition metal compound. Among the most valuable are alkyl aluminum compounds, especially trialkyl aluminum compounds such as triethyl aluminum, tripropyl aluminum, triisobutyl aluminum, and the like. Dialkyl aluminum compounds such as diethyl aluminum halides, diethyl aluminum chloride in particular, dipropylhalides, diisobutyl halides, and the like can also be used. Monoalkyl aluminum compounds can be employed. Generally in addition to trialkyl or triaryl aluminum compounds, organo-aluminum compounds having one or two hydrocarbon radicals, and two or one electronegative groups, such as halogen, alkoxy, organic nitrogen or sulfur groups, and the like can also be used. Organo-metallic compounds other than aluminum compounds that can be employed include $InEt_3$, $GaEt_3$, $BeEt_2$, and $ZnEt_2$. Systems of aluminum trialkyls, e.g. aluminum triethyl, with the above reduction product are particularly preferred and useful. The reduction product is treated in a non-oxidizing atmosphere with one or more of the above organo-metallic compounds in a mole ratio of 0.1 to 10 moles, preferably 1 to 3 of organo-metallic compound per mole of the reduction product at a temperature in the range of 25° to 135° C. The temperature is not critical although elevated temperatures which will result in decomposition of either or both of the components should of course not be used.

The polymerization of alpha olefins having from 2 to about 20 carbon atoms such as ethylene, propylene, butene-1, 3-methylbutene-1, heptene-1, dodecene-1, styrene and the like, is carried out by contacting the alpha olefin used with the catalyst mixture of the invention in a hydrocarbon solvent at a temperature of 0 to 150° C., preferably 70 to 130° C. and at pressures ranging from about 0 to 150 p.s.i.g., preferably atmospheric pressure in batch or continuous operation. Alpha olefins having from 3 to 5 carbon atoms are preferred for use with the catalysts of the invention since these alpha olefins form highly stereoregular polymers. The catalyst slurry is preferably diluted with additional solvent to provide a catalyst concentration for the polymerization of about 0.1 to 0.5 wt. percent, based on the weight of the solvent present. The polymer product concentration in the polymerization reaction mixture is preferably kept between about 2 and 25 wt. percent, based on the total contents present, so as to provide for easy handling of the polymerized mixture. When the desired quantity of polymer has been obtained, a $C_1$ to $C_8$ alkanol such as isopropyl alcohol or n-butyl alcohol, desirably in combination with a chelating agent such as acetylacetone or diacetyl is added to the reaction mixture to dissolve and deactivate the catalyst and to precipitate the polymer product from solution. The polymer product is then filtered and can be further washed with alcohol or an acid such as hydrochloric acid and dried, compacted, and packaged. It is important that the polymerization reaction be carried out in the absence of catalyst poisons such as water, oxygen, sulfur compounds, and the like.

The invention will be better understood by reference to the following examples which are given for illustration purposes only and are not meant to limit the invention.

EXAMPLE I

A slurry of 25 g. of copper dust in 350 ml. of toluene was heated to reflux with stirring under a nitrogen atmosphere. A solution of 173 g. of $TiCl_4$ in 150 ml. of toluene was added dropwise to the above mixture over a period of 45 minutes. The reaction was exothermic and a color change in the slurry took place from copper color to red-brown. The reaction mixture was then refluxed with stirring for an additional 17.5 hours. The resulting mixture was then cooled to room temperature, the solid product collected by filtration in a nitrogen atmosphere, triturated with an additional 500 ml. of fresh toluene, and refiltered. The resulting solid, deep purple in color, was washed with about 1 l. of n-heptane until the filtrate became colorless. After drying under vacuum at room temperature for four hours, the solid weighed 90.3 g., which is a yield of 90.5% based on $TiCl_3 \cdot CuCl$ as the product. The product was then ball-milled dry for three days, added to dry xylene, and 2 moles of triethyl aluminum added per mole of $TiCl_3 \cdot CuCl$. Propylene was then passed through the catalyst mixture in the xylene diluent at a temperature of about 71 to 75° C. at atmospheric pressure for 127 minutes. The reaction was then stopped and 2 liters of methanol added to precipitate the polymer. The polymer was then filtered and dried. Details of the catalyst preparation and the polymerization reaction are given in Table I.

Additional samples of the $TiCl_3 \cdot CuCl$ catalyst component of Example I were activated with the quantities of $AlEt_3$ given in Table I. These catalysts were then used to polymerize propylene. The details of the polymerizations and the polymer products are also given in Table I.

EXAMPLES V THROUGH VII

In order to show the advantages of the catalyst of the invention over (1) activated CuCl, (2) activated $TiCl_3$, and (3) an activated physical mixture of $TiCl_3$ and CuCl, polymerization reactions were carried out with the above catalyst components activated with $AlEt_3$ under conditions similar to those used in Examples I through IV. Details of these examples are given in Table I for comparison purposes.

*Table I*

ATMOSPHERIC PRESSURE POLYMERIZATION OF PROPYLENE USING 3-DAY BALL MILLED CATALYSTS

| Example | Catalyst | Al/Cu | $AlEt_3M \times 10^3$ | Temp., °C. | Polymerization Time, Min. | Polymer Yield, g. | Cat. Eff., (1) g./g./ 2 hrs. | Polymer Properties | | | |
|---|---|---|---|---|---|---|---|---|---|---|---|
| | | | | | | | | Intrinsic Viscosity | Mol. Wt. $\times 10^{-3}$ | Density | Tensile Strength, p.s.i.g. |
| I | $TiCl_3 \cdot CuCl$ | 2 | 5.0 | 71–5 | 127 | 187.8 | 486 | 2.54 | 160 | 0.8956 | 3,595 |
| II | $TiCl_3 \cdot CuCl$ | 2 | 5.0 | 75–6 | 60 | 86.1 | 4 446 | 2.16 | 125 | 0.8975 | 3,850 |
| III | $TiCl_3 \cdot CuCl$ | 2 | 2.5 | 70 | 90 | 50.6 | 4 350 | 1.06 | 40 | 0.8961 | |
| IV | $TiCl_3 \cdot CuCl$ | 1 | 2.5 | 75 | 120 | 34.4 | 90 | 2.14 | 125 | 0.8910 | 2,310 |
| V | CuCl | 2 | 5.0 | 74 | 90 | 0 | 0 | | | | |
| VI | $TiCl_3$ 3 | Al/Ti=2 | 5.0 | 75 | 120 | 62.0 | 161 | 2.44 | 155 | 0.8992 | 4,940 |
| VII | $TiCl_3+CuCl$ 2 | 2 | 5.0 | 75 | 120 | 57.3 | 149 | | | Frothy | brittle |

1 G. of polymer/g. of $TiCl_3$ for 2 hour run.
2 Equimolar mixture of $TiCl_3$ and CuCl, ball-milled for 3 days.
3 Ball-milled for 6 days.
4 Extrapolated values.

It can be seen from the above table that in Examples I through IV which employ the catalyts of the invention, excellent catalyst efficiencies and polymer properties result. It is particularly interesting to note that in Examples I and II, the catalyst efficiencies are markedly higher than the catalyst efficiency of Example VI which employs a very excellent prior art catalyst, namely, titanium trichloride activated with triethyl aluminum.

EXAMPLES VIII THROUGH XII

In these examples transition metal compounds other than $TiCl_4$ were employed to demonstrate that the method is applicable to a wide range of transition metal compounds. The conditions of catalyst preparation are given in Table II and the polymerization reactions using these catalysts are given in Table III.

Table II [1]

| Example | Metal Halide (g.) | Cu, g. | Diluent, (ml.) | Reflux Period, Hrs. | Yield, g. |
|---|---|---|---|---|---|
| VIII | TiBr$_4$ (190) | 31.8 | Toluene (250) | 20 | 195 |
| IX | VCl$_4$ (18.2) | 5.0 | CCl$_4$ (350) | 40 | 23 |
| X | VOCl$_3$ (9.2) | 5.0 | CCl$_4$ (350) | 60 | 14 |
| XI | {VCl$_4$ (15.3) / TiCl$_4$ (17.3)} | 10.0 | CCl$_4$ (350) | 90 | 28 |
| XII | {VCl$_4$ (2.9) / TiCl$_4$ (27.7)} | 10.0 | CCl$_4$ (350) | 45 | 17 |

[1] In all examples the metal halide or halide mixture was added in solution to a refluxing diluent slurry of Cu. The products are solid.

Table III

| Example | VIII | IX | X | XI* | XI | XII |
|---|---|---|---|---|---|---|
| Feed and Diluent: | | | | | | |
| Propylene, g | 75 | 75 | 75 | 75 | 75 | 75 |
| Xylene, ml | 50 | 50 | 50 | 50 | 50 | 50 |
| Catalyst: | | | | | | |
| Metal Halide, g | 1.08 | 0.64 | 0.75 | 0.64 | 0.78 | 0.64 |
| AlEt$_3$, g | 0.57 | 0.57 | 0.57 | 0.57 | 0.57 | 0.57 |
| Reaction Conditions: | | | | | | |
| Temperature, °C | 80 | 80 | 80 | 80 | 80 | 80 |
| Run Length, hrs | 2 | 2 | 2 | 2 | 2 | 2 |
| Results: | | | | | | |
| Solid Polymer Yield, g | 25 | 31 | 28 | 60 | 40 | 4 |
| Polymer density, g./cc | | | | 0.8803 | 0.8813 | 0.9261 |

*Ball milled for 3 days.

It can be seen from the above table that polymerization of alpha olefins can be carried out using the catalysts of the invention employing various transition metal compounds.

Modifications of the process in the invention can be made without departing from the scope and spirit of the invention.

What is claimed is:

1. An alpha olefin polymerization catalyst comprising a lower alkyl aluminum compound and a reduction product comprising a metal compound selected from the group consisting of TiCl$_3$, TiBr$_3$, VCl$_3$, and VOCl$_2$ cocrystallized with CuX, wherein X is the same halogen as the halogen in the metal compound, the molar ratio of metal compound to CuX being in the range of from about 1:1 to 3:1.

2. The catalyst of claim 1, wherein from 0.1 to 10 moles of the lower alkyl aluminum compound is present per mole of said reduction product.

3. The catalyst of claim 2 in which the lower alkyl aluminum compound is a trialkyl aluminum.

4. The catalyst of claim 3 in which the reduction product is TiCl$_3$ cocrystallized with CuCl and the lower alkyl aluminum compound is aluminum triethyl.

References Cited in the file of this patent

UNITED STATES PATENTS

| | | |
|---|---|---|
| 2,864,749 | Slatin | Dec. 16, 1958 |
| 2,879,263 | Anderson et al. | Mar. 24, 1959 |
| 2,886,560 | Weber | May 12, 1959 |
| 2,893,984 | Seelbach et al. | July 7, 1959 |
| 2,905,645 | Anderson et al. | Sept. 22, 1959 |
| 2,925,392 | Seelbach et al. | Feb. 16, 1960 |
| 2,977,350 | Fasce et al. | Mar. 28, 1961 |
| 2,980,664 | Stuart | Apr. 18, 1961 |
| 3,032,513 | Tarnqvist et al. | May 1, 1962 |
| 3,061,600 | Longiave et al. | Oct. 30, 1962 |
| 3,070,590 | Raum | Dec. 25, 1962 |

FOREIGN PATENTS

| | | |
|---|---|---|
| 218,210 | Australia | Nov. 3, 1958 |

OTHER REFERENCES

Koontz et al.: The Reaction of Metallic Copper with Titanium (IV) Chloride, in Journal of American Chemical Society, volume 70, pages 1936–37, May 1948.